(12) United States Patent
Maillard

(10) Patent No.: US 7,191,335 B1
(45) Date of Patent: *Mar. 13, 2007

(54) METHOD AND APPARATUS FOR ENCRYPTED TRANSMISSION

(75) Inventor: Michel Maillard, Maintenon (FR)

(73) Assignee: Canal + Technologies, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,587

(22) PCT Filed: Feb. 4, 2000

(86) PCT No.: PCT/IB00/00163

§ 371 (c)(1),
(2), (4) Date: Nov. 7, 2001

(87) PCT Pub. No.: WO00/46994

PCT Pub. Date: Aug. 10, 2000

(30) Foreign Application Priority Data

Feb. 4, 1999 (EP) .................................. 99400261

(51) Int. Cl.
*H04L 9/00* (2006.01)
(52) U.S. Cl. ..................... 713/176; 380/42; 380/259; 380/284
(58) Field of Classification Search ................ 380/284, 380/29, 42, 259, 277
See application file for complete search history.

(56) References Cited

U.S. PATENT DOCUMENTS

| 4,578,530 | A | * | 3/1986 | Zeidler | 705/71 |
|---|---|---|---|---|---|
| 5,253,294 | A | * | 10/1993 | Maurer | 380/264 |
| 5,748,735 | A | * | 5/1998 | Ganesan | 713/165 |
| 5,835,726 | A | * | 11/1998 | Shwed et al. | 709/229 |
| 5,870,474 | A | * | 2/1999 | Wasilewski et al. | 380/211 |
| 5,907,618 | A | * | 5/1999 | Gennaro et al. | 380/286 |
| 6,178,244 | B1 | * | 1/2001 | Takeda et al. | 380/277 |
| 6,662,299 | B1 | * | 12/2003 | Price, III | 713/171 |

FOREIGN PATENT DOCUMENTS

| EP | 0 723 371 A1 | 7/1996 |
|---|---|---|
| EP | 0 817 485 A1 | 1/1998 |
| WO | WO91/13517 | 9/1991 |

OTHER PUBLICATIONS

Schneier, Bruce, Applied Cryptography, 1996, John Wiley & Sons, Inc., Second Edition, p. 216.*
EBU Project Group; "Functional Model of a Conditional Access System", 8301 EBU review Technical (1995) Winter, No. 266, Grand-Saconnex, CH; pp. 64-77.
Hungarian Search Report, dated Mar. 5, 2002, 3 pages.

* cited by examiner

*Primary Examiner*—Nasser Moazzami
*Assistant Examiner*—Pramila Parthasarathy
(74) *Attorney, Agent, or Firm*—Osha Liang LLP

(57) ABSTRACT

A method of encryption of data in a digital television system communicated between a first decoder and a portable security module, wherein a precalculated key pair is stored in a memory of the first decoder, wherein the key pair includes a session key and an encrypted version of the session key prepared using a transport key, the encrypted version of the session key being subsequently communicated to the portable security module which decrypts the encrypted version using an equivalent transport key stored in its memory such that data communicated from at least the portable security module to the first decoder may thereafter be encrypted and decrypted by the session key.

17 Claims, 4 Drawing Sheets

METHOD AND APPARATUS FOR ENCRYPTED TRANSMISSION

The present invention relates to a method and apparatus for encryption of messages between two devices, for example a decoder and a portable security module in a digital television system.

Transmission of encrypted data is well-known in the field of pay TV systems, where scrambled audiovisual information is usually broadcast by satellite to a number of subscribers, each subscriber possessing a decoder capable of descrambling the transmitted program for subsequent viewing.

In a typical system, scrambled data is transmitted together with a control word for descrambling of the data, the control word itself being encrypted by a so-called exploitation key and transmitted in encrypted form. The scrambled data and encrypted control word are then received by a decoder having access to an equivalent of the exploitation key stored on a portable security module such as a smart card inserted in the decoder. The encrypted control word is then decrypted on the smart card and subsequently communicated to the decoder for use in descrambling the transmitted data.

In order to try to improve the security of the system, the control word is usually changed every ten seconds or so. This avoids the situation with a static or slowly changing control word where the control word may become publicly known. In such circumstances, it would be relatively simple for a fraudulent user to feed the know control word to the descrambling unit on his decoder to descramble the transmission.

Notwithstanding this security measure, a problem has arisen in recent years where the stream of control words sent during a broadcast becomes known through monitoring of data communicated at the interface between the smart card and decoder. This information may be used by any unauthorised user who has recorded the still-scrambled broadcast on a video recorder. If the film is replayed at the same time as the stream of control words is fed to the decoder, visualisation of the broadcast becomes possible. This problem has further been exacerbated with the rise of the internet and it is now common to find any number of internet sites that list the stream of control words emitted during a given transmission.

The European patent application PCT WO 97/3530 in the name of Digco addresses this problem by proposing a solution in which the control word stream passed across the interface between the smart card and decoder is itself encrypted with a session key. The session key is generated randomly by the decoder and encrypted with a second key held in the decoder and corresponding to a public key used with a private/public encryption algorithm. The associated smart card possesses the necessary private key to decrypt the session key, which is thereafter used by the smart card to encrypt the control word stream sent from the smart card to the decoder.

As will be appreciated, the use of a locally generated session key to encrypt the control word stream means that the encrypted stream cannot thereafter be fed into another decoder for use in descrambling the data since each decoder will possess a different session key for use in decrypting the control word stream sent from the smart card.

Whilst this solution provides a higher level of security than conventional systems there are nevertheless a number of disadvantages associated with this system.

Notably, the use of a public/private key algorithm is effectively obligatory in such a system since it is not desirable for security reasons to store both a symmetric key and the associated algorithm in the decoder, due to the ease in which this information may be extracted from a decoder memory. This problem does not arise in the case of a public key, since possession of this key does not enable decryption of private key encrypted messages.

It is one object of the present invention to provide a more adaptable alternative to the above known system. However, the invention is not limited to the field of decoder security and, as will be described below, may be applied to a number of other situations in which secure communication of data is required.

A first aspect of the present invention provides a method of encryption of data communicated between a first and second device, wherein at least one precalculated key pair is stored in a memory of the first device, said at least one key pair comprising a session key and an encrypted version of the session key prepared using a transport key, the encrypted version of the session key being subsequently communicated to the second device which decrypts the encrypted version using an equivalent transport key stored in its memory such that data communicated from at least the second to the first device may thereafter be encrypted and decrypted by the session key in the respective devices.

A preferred embodiment provides a method of encryption of data communicated between a first and second device, characterised in that one or more precalculated key pairs are stored in a memory of the first device, the or each key pair comprising a session key and an encrypted version of this session key prepared using a transport key, the encrypted value of the session key being subsequently communicated to the second device which decrypts this value using an equivalent transport key stored in its memory such that data communicated from at least the second to the first device may thereafter be encrypted and decrypted by the session key in the respective devices.

Unlike the Digco system described above, the use of a precalculated stored pair of values avoids the necessity of having to provide an encryption algorithm within the first device (e.g. the decoder) to encrypt an internally generated session key. As a consequence, the algorithm chosen to encrypt the session key need not be limited to a public/private key algorithm but may correspond to a symmetric type algorithm if desired. Nevertheless, as will be understood, the present invention may also be implemented using public/private key algorithms to encrypt the session key, as will be discussed in further detail below.

Advantageously, a plurality of key pairs are stored in the memory of the first device, the first device selecting and processing one or more session keys to generate a definitive session key and communicating the associated encrypted value or values to the second device for decryption and processing by the second device to generate the definitive session key.

The provision of a plurality of key pairs within the first device enables the first device to choose and define a different definitive session key for each communication session. In one embodiment, a subset of a plurality of stored session keys is chosen by the first device to generate the definitive session key, the associated encrypted values of these subset session keys being communicated to the second device for decryption and processing.

Depending on the type of operation used, the resulting definitive session key may be dependent on the order of combination of the chosen session keys. In such an embodiment, this order information is communicated to the second device to enable the second device to correctly generate the definitive session key using the associated encrypted values.

For example, an initial session key value known to both the first and second devices may be repeatedly encrypted in both devices by an ordered sequence of session keys using an encryption algorithm sensitive to the order of encryption, such as the DES symmetric algorithm.

Of course, where the first device is using a selected subset of keys to generate the definitive session key, it may not be necessary to also use an order dependent algorithm to generate a changeable definitive session key and the keys may be combined, for example, using a simple arithmetical operation.

In one advantageous embodiment, the one or more precalculated key pair values may be selected from a larger set of precalculated key pairs prior to storage in the first device. For example, the operator or system manager may communicate a large number of precalculated key pairs to the manufacturer of the first device, the device manufacturer thereafter selecting at random the key pairs to be stored in a given device.

In this way, the key pair or pairs embedded in the first device will be unique to that device, or at least quasi-unique, thereby increasing the level of security for the system. Furthermore, the entity responsible for manufacture of the device need not possess the algorithm or keys used to prepare the encrypted session key values but may be simply supplied with a table of key pairs.

Preferably, the encrypted key value or values communicated to the second device also include a signature value that may be read by the second device to verify the authenticity of the communicated value.

Such a signature value can be generated and verified in accordance with a conventional signature system, for example using combination of hash and public/private key algorithms such as MD5 and RSA, this signature being appended to the key pair values stored in the first device.

Conveniently, the signature value can also be precalculated at the time of calculation of the encrypted key value and thereafter stored in the first device.

In a particularly preferred embodiment, the algorithm and transport key used to encrypt and decrypt the session key or keys correspond to a symmetric algorithm and associated symmetric key. The use of a symmetric algorithm enables an increase in the processing time necessary for the second device to decrypt the session key in comparison with an operation using a public/private key algorithm.

Whilst one of the advantages of the present invention lies in the adaptability of the present system to use a symmetric algorithm, it will be appreciated that this is not obligatory. For example, in an alternative embodiment, the session key or keys may be encrypted by a public key prior to storage in the first device and decrypted by an equivalent private key within the second device.

Further preferably, the encryption algorithm used with the session key to encrypt and decrypt data communicated between the first and second device (or vice versa) corresponds to a symmetric algorithm. The choice of algorithm used may depend on the system requirements such as the need to have bidirectional communication between the devices.

Suitable symmetric algorithms may include DES or even an appropriate proprietary algorithm. Suitable public/private key algorithms may comprise RSA or other similar algorithms.

As mentioned above, the present invention is particularly applicable to the field of digital television and, in one preferred embodiment, the first device corresponds to a decoder and the second device to a portable security module (or vice versa).

The portable security module may conveniently comprise a smart card. If so, the data encrypted with the session key may correspond to simple control word information used by the decoder to descramble broadcast data.

The same principle may also be applied to the case where the descrambling unit in the decoder is implemented as a detachable conditional access module or CAM, broadcast data being descrambled in the conditional access module and communicated to the decoder.

In this embodiment, the first device may thus correspond to a decoder and the second device to a detachable conditional access module. If so, the data encrypted with the session key will normally correspond to the data descrambled by the conditional access module e.g. the broadcast programme itself.

In a conditional access module implementation, a smart card may also form part of the system, this card being inserted in the conditional access module to decrypt the control word, which is then passed to the conditional access module to permit descrambling of the broadcast programme. If so, the first device may then correspond to a conditional access module, the second device to a smart card and the data encrypted with the session key to control word data.

Within the field of digital television, the invention may also be applied to the communication of data between a decoder and other devices, such as a television or video recorder. In particular, in one embodiment, the first device corresponds to a first decoder and the second device to a second decoder.

In households possessing a first and second decoder, there are often a number of problems associated with maintaining communication between a first or "master" decoder and a second "slave" decoder. The use of a secure encrypted link to communicate audiovisual data, control word data, or even data relating to current subscription rights and exploitation keys, may prove useful in this context.

In yet a further realisation, the present invention may be applied to home network system, the first and second devices corresponding to first and second consumer electronic devices adapted to transfer data via a communication link (e.g. radio, PLC, infra-red etc.).

The above embodiments have been described in relation to a method of encryption of data. Viewed from another aspect, the invention may equally be applied to first and second devices adapted to carry out such a method.

Another aspect of the present invention provides a system for providing secure communication of data between first and second devices, said first device comprising a memory for storing at least one precalculated key pair comprising a session key and an encrypted version of the session key prepared using a transport key, and communication means, such as a communication link, for communicating the encrypted version of the session key to said second device, said second device comprising a memory for storing an equivalent transport key, decryption means, such as a processor, for decrypting said encrypted version of the session key using said equivalent transport key, and means, such as the processor, for encrypting data to be communicated to said first device using said session key.

Features described above relating to method aspects of the present invention can also be applied to device or system aspects, and vice versa.

As used above, the terms "portable security module", "smart card" and "conditional access module" may be interpreted in their broadest sense as applying to any portable microprocessor and/or memory based card capable of carrying out the described functions.

As particular examples of such devices, a smart card may correspond to a card device constructed in accordance with the known international standards ISO 7816-1, 7816-2 and 7816-3 whilst the conditional access module may be implemented as a PCMCIA or PC card corresponding to the standards fixed by the PCMCIA group. Other physical shapes and forms are of course possible.

The terms "scrambled" and "encrypted" and "control word" and "key" have been used at various parts in the text for the purpose of clarity of language. However, it will be understood that no fundamental distinction is to be made between "scrambled data" and "encrypted data" or between a "control word" and a "key".

Similarly, unless obligatory in view of the context stated or unless otherwise specified, no limitation to either symmetric or public/private algorithms is to be inferred for a given encryption and/or decryption process. In the same way, whilst the matching keys used in encrypting and decrypting information may be referred to by the same name (e.g. "transport key", "session key") it is to be understood that these need not be numerically identical keys as long as they fulfil their functions. For example, the corresponding public and private keys used to encrypt and decrypt data will normally possess numerically different values.

The term "receiver/decoder" or "decoder" as used herein may connote a receiver for receiving either encoded or non-encoded signals, for example, television and/or radio signals, which may be broadcast or transmitted by any appropriate means. Embodiments of such decoders may also include a decoder integral with the receiver for decoding the received signals, for example, in a "set-top box", a decoder functioning in combination with a physically separate receiver, or such a decoder including additional functions, such as a web browser, integrated with other devices such as a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

As used herein, the term "digital television system" includes for example any satellite, terrestrial, cable and other system.

There will now be described, by way of example only, a number of embodiments of the invention, with reference to the following figures, in which.

The present invention describes a method of encryption of data, in particular but not exclusively applicable to the encryption of data across the interface between a portable security module and decoder in a digital television system.

By way of background, the architecture of a known digital television system will now be described.

Digital Television System

Figure 1:
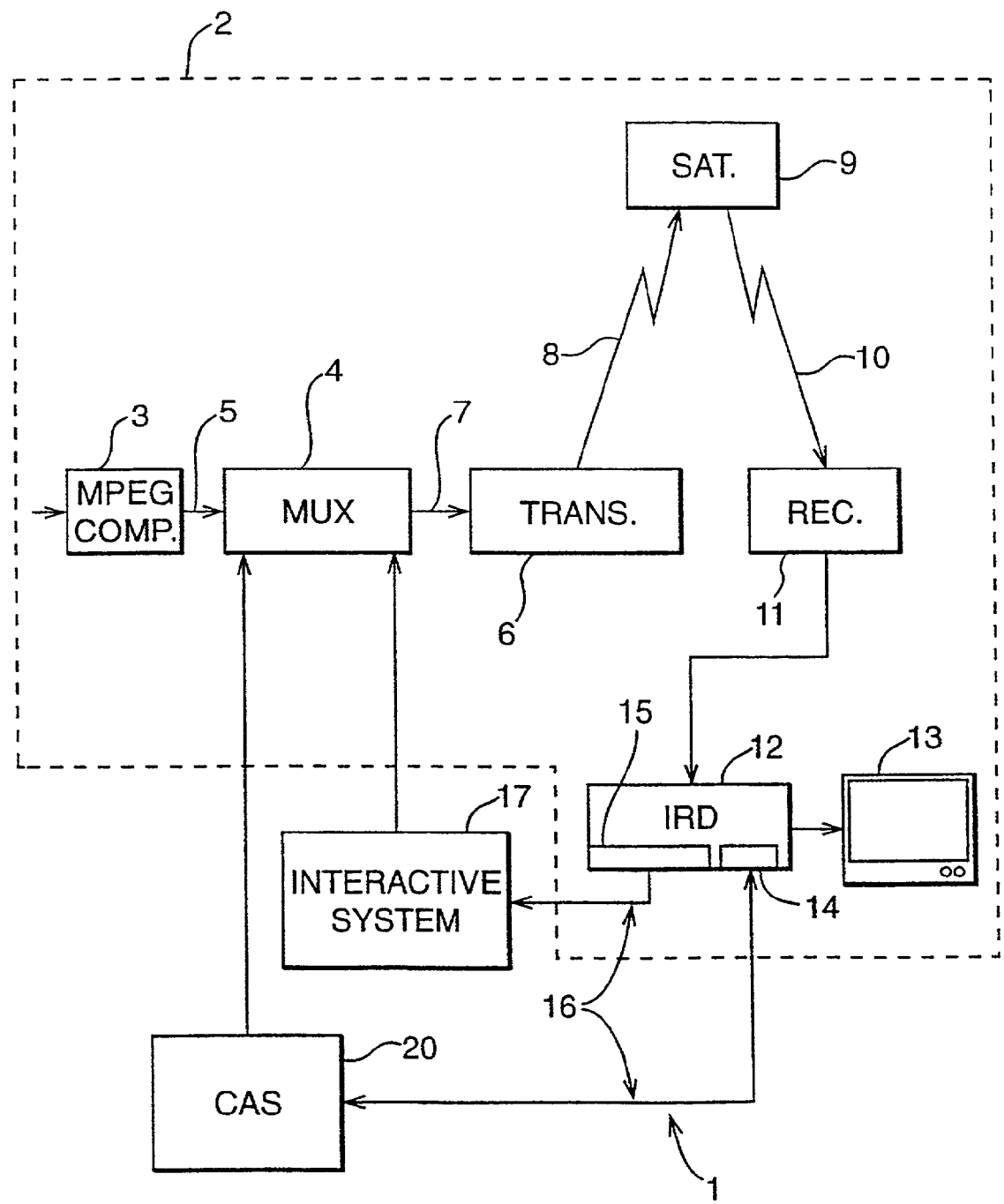
FIG. 1 shows by way of background the overall architecture of a digital TV system.

An overview of a digital television system 1 is shown in FIG. 1 comprising a broadcast system 2 which uses the MPEG-2 compression system to transmit compressed digital signals. In more detail, an MPEG-2 compressor 3 in a broadcast centre receives a digital signal stream (for example a stream of audio or video signals). The compressor 3 is connected to a multiplexer and scrambler 4 by linkage 5. The multiplexer 4 receives a plurality of further input signals, assembles one or more transport streams and transmits compressed digital signals to a transmitter 6 of the broadcast centre via linkage 7, which can of course take a wide variety of forms including telecom links.

The transmitter 6 transmits electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

A conditional access system 20 is connected to the multiplexer 4 and the receiver/decoder 12, and is located partly in the broadcast centre and partly in the decoder. It enables the end user to access digital television broadcasts from one or more broadcast suppliers. A portable security module in the form of a smartcard capable of decrypting messages relating to broadcast programmes or data can be inserted into the receiver/decoder 12.

An interactive system 17, also connected to the multiplexer 4 and the receiver/decoder 12 and again located partly in the broadcast centre and partly in the decoder, may be provided to enable the end user to interact with various applications via a modemmed back channel 16.

Figure 2:
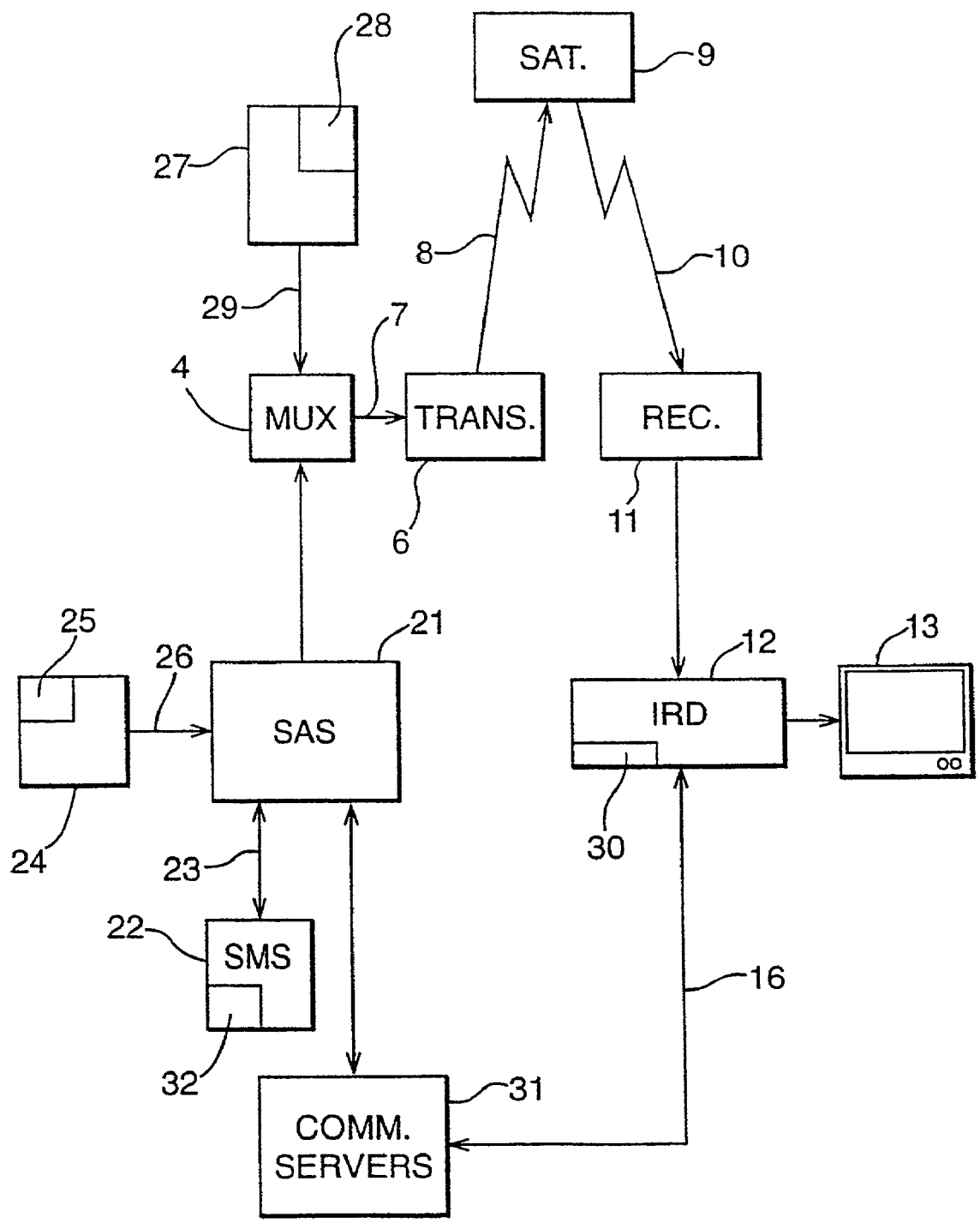
FIG. 2 shows the architecture of the conditional access system of FIG. 1.

The conditional access system 20 will now be described in more detail. With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, for example by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 utilising "mother" smartcards 25 are connected to the SAS by linkage 26. Second encrypting units again in the form of ciphering units 27 utilising mother smartcards 28 are connected to the multiplexer 4 by linkage 29. The receiver/decoder 12 receives a portable security module, for example in the form of "daughter" smartcard 30. It is connected directly to the SAS 21 by Communications Servers 31 via the modemmed back channel 16. The SAS sends, amongst other things, subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 24 and 27 comprise a rack, an electronic VME card with software stored on an EEPROM, up to 20 electronic cards and one smartcard 25 and 28 respectively, for each electronic card, one card 28 for encrypting the ECMs and one card 25 for encrypting the EMMs.

The operation of the conditional access system 20 of the digital television system will now be described in more detail with reference to the various components of the television system 2 and the conditional access system 20.

Multiplexer and Scrambler

With reference to FIGS. 1 and 2, in the broadcast centre, the digital audio or video signal is first compressed (or bit rate reduced), using the MPEG-2 compressor 3. This compressed signal is then transmitted to the multiplexer and scrambler 4 via the linkage 5 in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels.

In the Pay Per View mode, the end user is provided with the capability to purchase events as he wishes. This can be achieved by either pre-booking the event in advance ("pre-book mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Entitlement Control Messages

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 9. In respect of each scrambled component of the service, a separate ECM is required. Alternatively, a single ECM may be required for all of the scrambled components of a service. Multiple ECMs are also generated in the case where multiple conditional access systems control access to the same transmitted program.

Entitlement Management Messages (EMMs)

The EMM is a message dedicated to an individual end user (subscriber), or a group of end users. Each group may contain a given number of end users. This organisation as a group aims at optimising the bandwidth; that is, access to one group can permit the reaching of a great number of end users.

Various specific types of EMM can be used. Individual EMMs are dedicated to individual subscribers, and are typically used in the provision of Pay Per View services; these contain the group identifier and the position of the subscriber in that group.

Group subscription EMMs are dedicated to groups of, say, 256 individual users, and are typically used in the administration of some subscription services. This EMM has a group identifier and a subscribers' group bitmap.

Audience EMMs are dedicated to entire audiences, and might for example be used by a particular operator to provide certain free services. An "audience" is the totality of subscribers having smartcards which bear the same conditional access system identifier (CA ID). Finally, a "unique" EMM is addressed to the unique identifier of the smartcard.

EMMs may be generated by the various operators to control access to rights associated with the programs transmitted by the operators as outlined above. EMMs may also be generated by the conditional access system manager to configure aspects of the conditional access system in general.

The term EMM is also often used to describe specific configuration type messages communicated between the decoder and other elements of the system and, for example, will be used later in this application to refer to a specific message passed from the decoder to a smart card.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS.

Each SMS 22 transmits messages to the SAS 21 via respective linkage 23 which imply modifications to or creations of Entitlement Management Messages (EMMs) to be transmitted to end users.

The SMS 22 also transmits messages to the SAS 21 which imply no modifications or creations of EMMs but imply only a change in an end user's state (relating to the authorization granted to the end user when ordering products or to the amount that the end user will be charged).

The SAS 21 sends messages (typically requesting information such as call-back information or billing information) to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 21 is to manage the access rights to television programmes, available as commercial offers in subscription mode or sold as PPV events according to different modes of commercialisation (pre-book mode, impulse mode). The SAS 21, according to those rights and to information received from the SMS 22, generates EMMs for the subscriber.

The EMMs are passed to the Ciphering Unit (CU) 24 for ciphering with respect to the management and exploitation keys. The CU completes the signature on the EMM and passes the EMM back to a Message Generator (MG) in the SAS 21, where a header is added. The EMMs are passed to a Message Emitter (ME) as complete EMMs. The Message Generator determines the broadcast start and stop time and the rate of emission of the EMMs, and passes these as appropriate directions along with the EMMs to the Message Emitter. The MG only generates a given EMM once; it is the ME which performs cyclic transmission of the EMMs.

On generation of an EMM, the MG assigns a unique identifier to the EMM. When the MG passes the EMM to the ME, it also passes the EMM ID. This enables identification of a particular EMM at both the MG and the ME.

Programme Transmission

The multiplexer 4 receives electrical signals comprising encrypted EMMs from the SAS 21, encrypted ECMs from the second encrypting unit 27 and compressed programmes from the compressor 3. The multiplexer 4 scrambles the programmes and sends the scrambled programmes, the encrypted EMMs and the encrypted ECMs to a transmitter 6 of the broadcast centre via the linkage 7. The transmitter 6 transmits electromagnetic signals towards the satellite transponder 9 via uplink 8.

Programme Reception

The satellite transponder 9 receives and processes the electromagnetic signals transmitted by the transmitter 6 and transmits the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled programmes with encrypted EMMs and encrypted ECMs.

If the programme is not scrambled, that is, no ECM has been transmitted with the MPEG-2 stream, the receiver/decoder 12 decompresses the data and transforms the signal into a video signal for transmission to television set 13.

If the programme is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the programme. If the end user does have the rights, the ECM is decrypted within the smart card and the control word extracted.

Thereafter the smart card then communicates the control word to the decoder 12 which then descrambles the programme using this control word. In most conventional systems, the control word is communicated across the smart card interface in a clear or non-encrypted form, leading to the problems of security described in the introduction of the present application. After descrambling by the decoder, the MPEG-2 stream is decompressed and translated into a video signal for onward transmission to television set 13.

In the system described above, the descrambling of the MPEG data is carried out within the decoder using the control word information communicated to the decoder from the smart card. In other systems, the descrambling circuitry may be implemented in a detachable conditional access module or CAM, commonly embodied in the form of a PCMCIA or PC card insertable in a socket in the decoder.

The CAM module may itself further include a slot to receive a smart card. In such systems, control word data is decrypted in the smart card communicated to the CAM module which then descrambles the scrambled MPEG data stream to supply the decoder with a clear MPEG stream for decompression and subsequent display.

In this type of system, sensitive data may be passed between the smart card and CAM (control word data) and/or between the CAM and decoder (descrambled MPEG data) and problems of security may arise at either of these interfaces.

Data Encryption across an Interface

Figure 3:
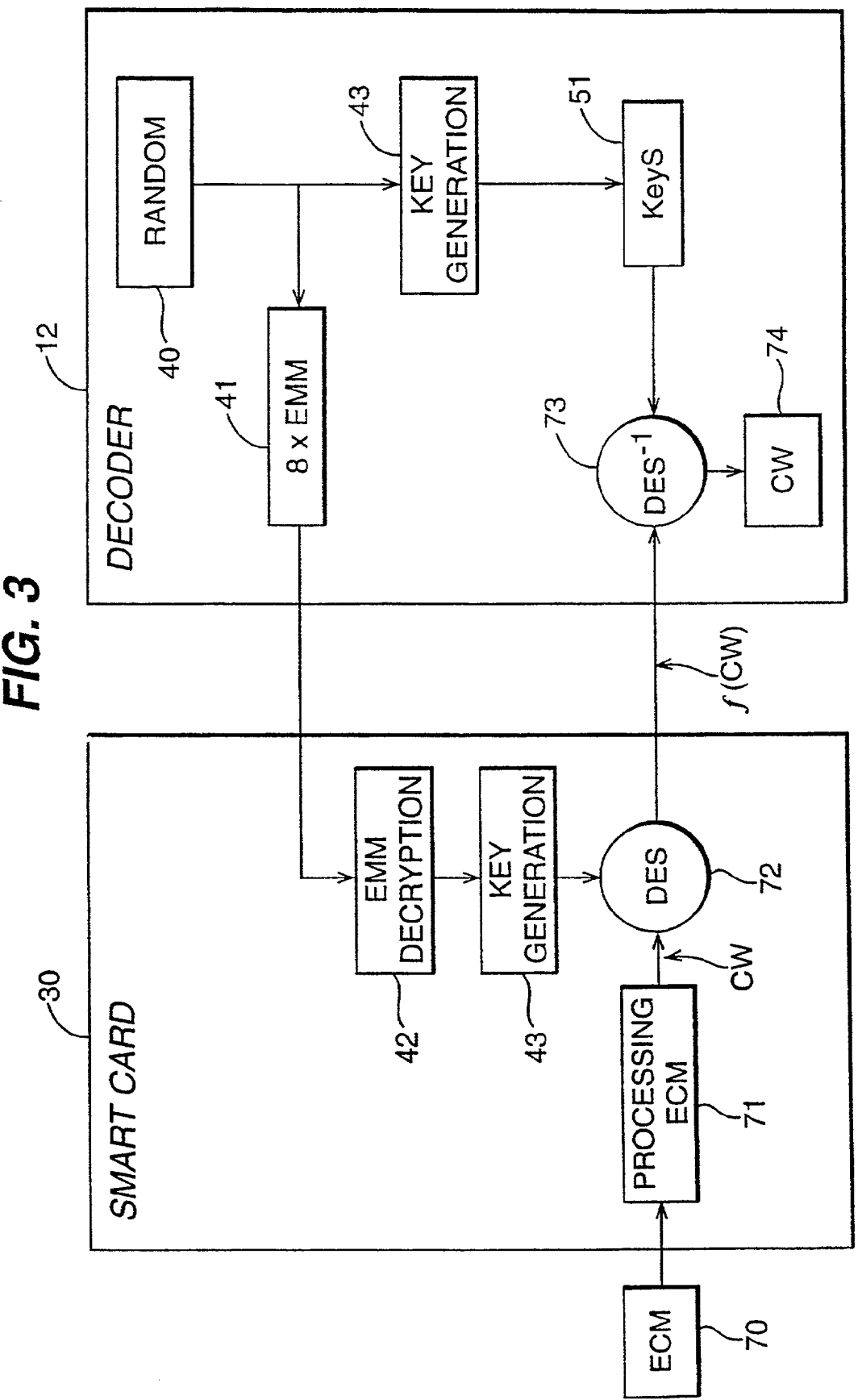
FIG. 3 shows a method of encryption of data between a smart card and a decoder according to this embodiment of the invention.

Referring to FIG. 3, there will now be described a method of data encryption as applied to the control word data communicated between a smart card and a decoder in one of the simplest embodiments of this invention. However, the same principles may be applied to the encryption of control word data between a smart card and a CAM, audiovisual MPEG data between a CAM and a decoder, or indeed any type of data between two such devices.

In accordance with the present invention, a set of key pairs is stored in a non-volatile memory of the decoder e.g. a FLASH memory. Each key pair corresponds to a key value in clear form and an encrypted version of the key. As will be described, the encrypted version of the key will be eventually communicated in an EMM message sent to a smart card inserted in the decoder.

Thus, within the decoder a set of EMM message/key pairs are stored as follows:

| n | EMM (19 octets) | Key (8 octets) |
|---|---|---|
| 1 | EMM (1) | Key (1) |
| 2 | EMM (2) | Key (2) |
| 3 | EMM (3) | Key (3) |
| . | . | . |
| . | . | . |
| . | . | . |
| 16 | EMM (16) | Key (16) |

The encrypted value of the key stored in the EMM is calculated external of the decoder using an encryption algorithm not present in the decoder. In the present example the key values Key(1), Key(2) etc. correspond to symmetric keys to be used with a symmetric encryption algorithm such as DES.

The encryption algorithm used to prepare the encrypted DES key values contained with the stored EMM messages may also correspond to a symmetric encryption algorithm. For increased security, a proprietary symmetric algorithm (PSA) different from DES will be used to prepare the encrypted values, although in another embodiment DES may also be used to encrypt the key values.

In addition to the encrypted value of the associated key, the EMM message may also include a signature value associated with the message and prepared as per any conventional signature preparation method. For example, a message may be subject to a hash function such as MD5 followed by encryption of the hash value by a private key of private/public key algorithm such as RSA. Verification of the signature may then be carried out at the point of reception using a MD5 algorithm and the corresponding public key of the private/public key pair.

The EMM message will additionally include a standard smart card header element (as defined by the international standard ISO 7816-3) to place the message in a format necessary to permit it to be read by a smart card. An EMM associated with an 8 byte key will therefore typically have the following structure:

| Header | 5 bytes |
| Encrypted key | 10 bytes |
| Signature | 9 bytes |

In the present embodiment a set of 16 key/message pairs are implanted in the memory of the decoder. Alternative embodiments are equally possible using more or less key/message pairs and the invention may even be implemented using a single key/message pair. Whilst it may be envisaged that all decoders are equipped with the same key/message pairs it is preferred for security reasons that each decoder has a unique set of key/message pairs. In implementing this embodiment, an operator may supply to a decoder manufacturer a set of ten thousand or more key/message pairs, the decoder manufacturer taking a random selection of 16 pairs during the personalisation of each decoder.

In order to increase the security, a different subset of the message/key pairs stored in the decoder will be used during each session. A session may be defined as corresponding to each time the decoder is switched on and off, or each time the decoder changes channel, for example.

Referring to FIG. 3, a random number generator 40 within the decoder selects 8 out of the 16 message/key pairs to be used in that session. The 8 selected EMM messages 41 of the pairs are then communicated to the smart card 30 to be verified and decrypted and processed as shown at 42 and 43 to obtain the appropriate session key (see below). The same key generation operation is carried out within the decoder at 43 using the corresponding key values of the pairs so as to obtain the same session key value.

Figure 4:
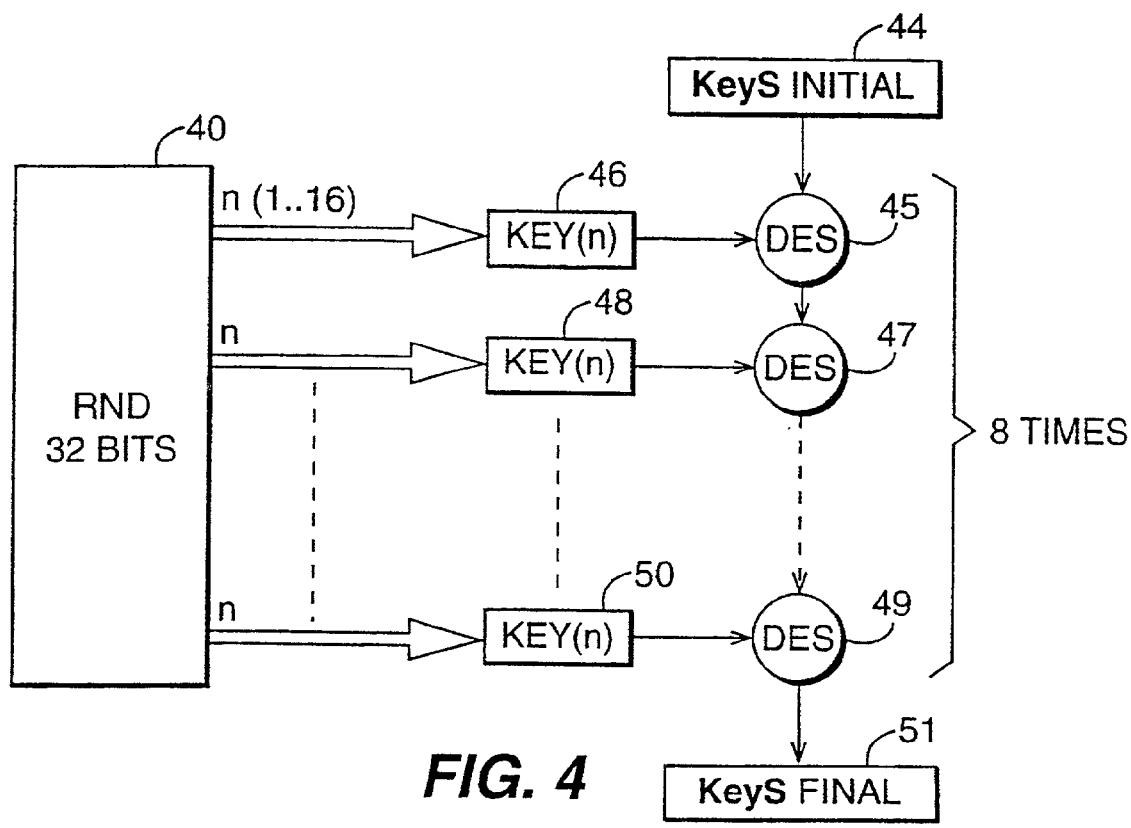
FIG. 4 shows the generation of a session key in a decoder operating according to the embodiment of FIG. 3.

The generation of the session key within the decoder will now be described with reference to FIG. 4.

A base session key value KeyS Initial shown at 44 and constant for all decoders is encrypted at 45 by the first key 46 of the subset chosen by the random generator 40. The resulting value is then encrypted at 47 using the second key 48 of the session subset and the operation repeated just until the last encryption operation 49 carried out with the last key 50 of the subset so as to obtain the final session key value shown at 51.

The initial session key value KeyS Initial can be a universal value present in all decoders and smart cards, a value linked to a specific decoder/smart card pair or even a value generated at the start of each session in the decoder and thereafter communicated to the smart card.

In the example given above, the session key is prepared by a sequence of repeated operations on the KeyS Initial using the DES algorithm and the selected keys 46, 48, 50 etc. In the case of the DES algorithm, the order in which the keys are applied is important and must be respected to produce the same key each time.

However, whilst the session key S is itself a numerical value that will be used as a DES key in the subsequent decryption operation (see below), the steps used to generate this key value need not correspond to DES encryption steps. Instead, the subset of keys chosen by the random number generator may be combined together in any number of ways to arise at a suitable session key value KeyS Final. For example, the keys may be combined using a sequence of simple arithmetic operations. Depending on the method chosen, it may not be necessary that the order of the steps in the preparation of the KeyS be respected in order to regenerate the same key.

Figure 5:
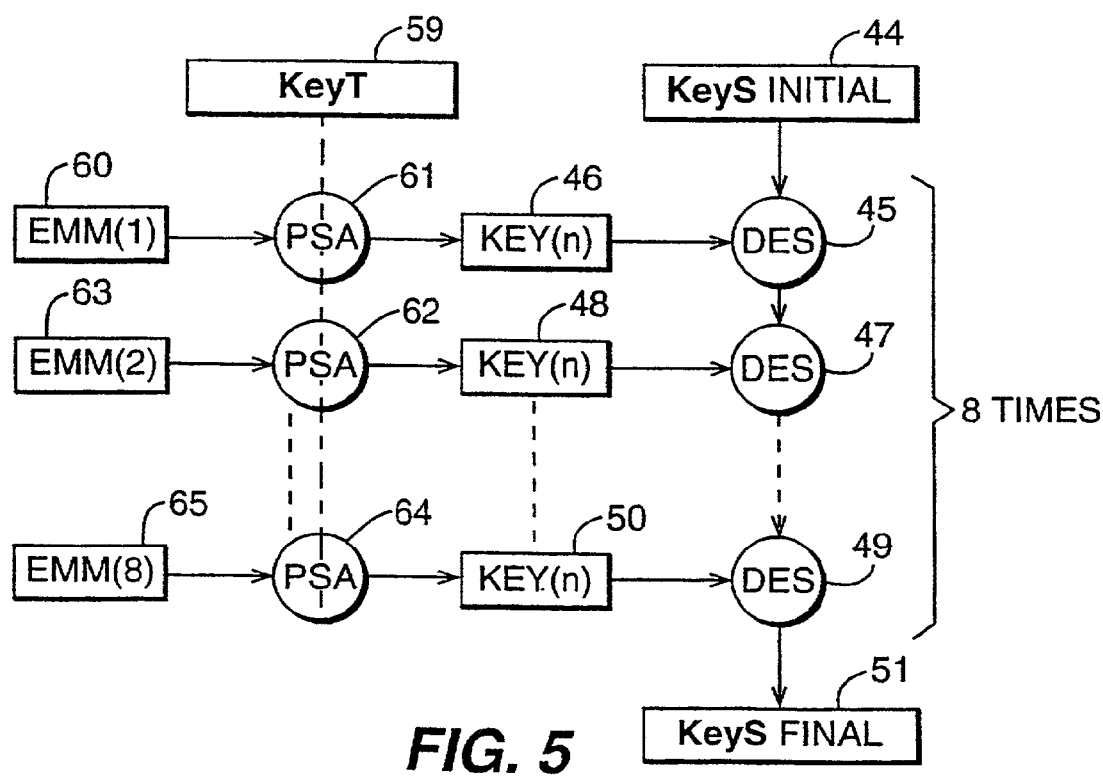
FIG. 5 shows the steps in the preparation of a session key in a smart card interfacing with the decoder of FIG. 4.

Referring now to FIG. 5, the decryption and processing operations 42 and 43 carried out in the smart card 30 to generate the session key used by the smart card will now be described Upon insertion of the smart card in the decoder, the subset of EMM messages matching the selected key values are sent to the smart card. Authentification of each EMM messages is first carried out with reference to the attached signature value, using for example an MD5/RSA type process as described above. For simplicity, this step has been omitted from FIG. 5.

The first EMM message 60 is then decrypted at 61 using a transport key 59 embedded in a secure and non-readable manner within the smart card. As mentioned above, for security reasons the algorithm used in the decryption 61 of the EMM message may correspond to a proprietary security algorithm PSA known only to the operator responsible for preparation of the message/key pairs used in the decoder and the personalisation of the smart card.

The transport key KeyT shown at 59 may be a key value common to all smart cards in the system or unique to one such card. The use of a unique key value KeyT requires that the message/key table stored in the decoder be prepared with the same key as that in the card, such that a decoder and card will be irreversibly linked together. In practice, this may not be desirable.

A similar decryption operation using the transport key 59 is then carried out at 62 on the next EMM message 63 in the series and 50 on until the last decryption operation 64 on the final EMM message 65.

In the present embodiment, encryption of each of the EMM messages 60, 63, 65 produces keys 46, 48, 50 identical to those associated in the message/key table present in the decoder and used for generation of the session key as described previously. For this reason, the same reference numbers have been used for these keys and for the key generation operation 43 also carried out in the decoder. Similarly, the same initial session key 44 present in the decoder is also stored in the smart card.

The initial session key KeyS Initial shown at 44 is then encrypted at 45 by the first key 46, the result re-encrypted at 47 by the second key 48 and so on until the final encryption step carried out at 49 using the last key 50 in the series so as to obtain the final session key at 51.

Both the decoder and smart card now possess the same session key KeyS which may thereafter be used in encrypting and decrypting data passed in either direction between the two devices.

Referring back to FIG. 3, the smart card 30 receives an encrypted ECM message containing the control word necessary for descrambling an associated segment of MPEG audiovisual or other data. The smart card decrypts the ECM at 71 to obtain the control word value CW.

In passing, we note that the algorithm used to encrypt ECM messages for a user may conveniently correspond to the Proprietary Security Algorithm used for decryption of the EMM messages received from the smart card as described above.

The decrypted control word is then re-encrypted at 72 using the session key KeyS and the encrypted control word value f(CW) transmitted over the decoder/smart card interface as shown. The encrypted value f(CW) is then decrypted at 73 using the session key KeyS held in the decoder and the clear value of the control word CW obtained at 74.

As the session key is symmetric, it may equally be used in the encryption of data transmitted from the decoder to the smart card. Furthermore, the data transmitted from the smart card to the decoder may be data other than simple control word data.

As mentioned above, the same principle may be applied across all interfaces in a system comprising a decoder in which a detachable CAM module is inserted (decoder/CAM interface, CAM/smart card interface etc.). Similarly, the same principle may be applied in the case of a portable module (either a CAM type module or a smart card) inserted in other devices such as a television or video recorder.

In fact, the above method of setting up an encrypted communication channel may be applied to any pair of devices where security of data communication is required. In particular, the same principle may be applied in a home network system where multiple consumer devices (television, video, PC, decoder etc.) transfer data such as audio-visual data or computer files via a communication link. This may be an RF link, an infrared link, a dedicated bus, a power line connection etc. For example, it may be desired to transmit control word in other data in an encrypted form between a decoder and a television or between a master decoder and a slave decoder in the same household.

Other examples of systems of this type where a secure communication link would be desirable will also be apparent to the reader.

The invention claimed is:

1. A method of encryption of data in a digital television system communicated between a first decoder and a portable security module operatively connected to the first decoder on a receiving side of the digital television system, comprising:
storing a plurality of precalculated key pairs in a memory of the first decoder, each of said plurality of precalculated key pairs comprising a session key and an encrypted session key prepared using a transport key,
selecting and processing at least one session key to generate a definitive session key, wherein the definitive session key is generated by repeatedly encrypting an initial session key value known to both the first decoder and the portable security module in both devices using an ordered sequence of session keys and an encryption algorithm sensitive to an order of encryption; and
communicating the ordered sequence of session keys and an encrypted version of said at least one session key to the portable security module,
wherein the portable security module is configured to use the ordered sequence of session keys and the transport key to decrypt the encrypted version of the at least one session key to obtain the definitive session key,
wherein the transport key is stored in a memory associated with the portable security module;
wherein data communicated from at least the portable security module to the first decoder may thereafter be encrypted and decrypted by the definitive session key.

2. A method as claimed in claim 1 in which a subset of a plurality of stored session keys is chosen by the first decoder to generate the definitive session key, the associated encrypted versions of the subset of session keys being communicated to the portable security module for decryption and processing.

3. A method as claimed in claim 1 in which said at least one precalculated key pair is selected from a larger set of precalculated key pairs prior to being stored in the first decoder.

4. A method as claimed in claim 1 in which the encrypted version of a session key communicated to the portable security module also includes a signature value readable by the portable security module to verify the authenticity of the encrypted session key.

5. A method as claimed in claim 1 in which an algorithm and transport key used to encrypt and decrypt a session key correspond to a symmetric algorithm and associated symmetric key.

6. A method as claimed in claim 1 in which an encryption algorithm used with the definitive session key to encrypt and decrypt data communicated between the first decoder and the portable security module corresponds to a symmetric algorithm.

7. A method as claimed in claim 1, in which the portable security module corresponds to one of a smart card and a conditional access module.

8. A method as claimed in claim 1, in which the first decoder corresponds to a conditional access module and the portable security module corresponds to a smart card.

9. A method as claimed in claim 1, in which data encrypted and decrypted with the definitive session key corresponds to a control word data.

10. A method as claimed in claim 1, in which data encrypted and decrypted with the definitive session key corresponds to descrambled broadcast data.

11. A method as claimed in claim 1 as applied to a home network system, wherein the first decoder and the portable security module correspond to consumer electronic devices adapted to transfer data via a communication link.

12. A digital television system for providing secure communication of data, comprising:
a first decoder comprising:
a memory for storing a plurality of precalculated key pairs, wherein each of the plurality of precalculated key pairs comprises a session key and an encrypted session key prepared using a transport key;
a means for selecting and processing at least one session key to generate a definitive session key, wherein the definitive session key is generated by repeatedly encrypting an initial session key value known to both the first decoder and a portable security module using an ordered sequence of session keys and an encryption algorithm sensitive to an order of encryption; and
communicate the ordered sequence of session keys and an encrypted version of said at least one session key to the portable security module;
the portable security module operatively connected to the first decoder on a receiving side of the digital television system comprising:
a memory for storing the transport key;
means for decrypting the encrypted version of said at least one session key using the transport key and the ordered sequence of session keys to obtain the definitive session key; and means for encrypting data using the definitive session key, wherein the encrypted data is communicated using a communication means to said first decoder.

13. A system as claimed in claim 12, in which the encrypted version of a session key includes a signature value readable by the portable security module to verify the authenticity of the encrypted session key.

14. A system as claimed in claim 12, in which an algorithm and transport key used to encrypt and decrypt a session key correspond to a symmetric algorithm and associated symmetric key.

15. A system as claimed in claim 12, in which an encryption algorithm used with the definitive session key to encrypt and decrypt data communicated between first decoder and the portable security module corresponds to a symmetric algorithm.

16. A system as claimed in claim 12, in which the portable security module corresponds to one of a smart card and a conditional access module.

17. A system as claimed in claim 12 as applied to a home network system, wherein the first decoder and the portable security module correspond to consumer electronic devices adapted to transfer data via a communication link.

\* \* \* \* \*